United States Patent Office 3,728,309
Patented Apr. 17, 1973

3,728,309
PROGRESSIVE HEATING IN POLYESTER CONDENSATIONS
Emil J. Maxion, North Brunswick, N.J., assignor to Mobil Oil Corporation
No Drawing. Filed June 13, 1969, Ser. No. 833,155
Int. Cl. C08g 17/01
U.S. Cl. 260—75 M     10 Claims

ABSTRACT OF THE DISCLOSURE

Unusually high reaction temperatures may be employed in the solid state polycondensation of crystalline linear polyester prepolymers or resins (e.g., polyethylene terephthalate) having a reduced specific viscosity of 0.2 or more by maintaining the polycondensation temperature initially (e.g., at 200–230° C.) between the sticking temperature of the resin in the amorphous state and in the initial crystalline state until the resin sticking temperature has substantially further increased as the reaction progresses, and thereafter elevating the polycondensation temperature either stepwise or gradually to a level (e.g., 240° C. or more) substantially above the initial crystalline sticking temperature in producing resins of higher molecular weight without significant agglomeration; the reaction rates are generally faster and higher molecular weights are obtainable than heretofore.

CROSS-REFERENCES TO RELATED APPLICATIONS

Certain claims in my concurrently filed application Ser. No. 833,177 now Pat. No. 3,544,523 and some of the claims in my concurrently filed joint application with Andrew J. Foglia, Ser. No. 833,156, now abandoned, recite combination processes which include features of the present invention in addition to procedures which are described and claimed per se in each of the aforesaid applications.

BACKGROUND OF THE INVENTION

Field of the invention

This invention relates to an improved process for the preparation of high molecular weight linear polyester resins by the solid phase polymerization or polycondensation of polyesters of lower molecular weight.

Prior art

There is an increasing demand for resins derived from the homopolymerization and copolymerization of esters of ethylene glycol and terephthalic acid in varying degrees of polymerization as exemplified by a number average molecular weight of the order of 17,000 for textile fibers in general or about 30,000 for tire cord grade material, and interest is being displayed in the injection molding and blow molding of material of higher molecular weight, such as 36,000 or more. The aforesaid molecular weights correspond to approximately 0.7, 1.15 and 1.4 RSV, respectively, where RSV represents the reduced specific viscosity of a solution of 5 grams of the resin dissolved in one liter of a mixture of equal weights of phenol and tetrachloroethane when determined at 25° C. and calculated in known manner.

The common commercial practice for producing polyethylene terephthalate involves melt-polymerization in which the material is maintained in the molten state at relatively high temperatures of 265 to 300° C. during the entire process. Typical preparations of this type are described in Whinfield et al. Pat. No. 2,465,319, in "Preparatory Methods of Polymer Chemistry" by W. R. Sorenson and T. W. Campbell, Interscience Publishers (1961) page 113 and in "Macromolecular Synthesis," C. G. Overberger, Ed., John Wiley & Sons (1963), vol. 1, pages 17–23. Melt-polymerization has a number of limitations and disadvantages inasmuch as a simple stirred kettle apparatus can only be employed for polymerizing the material up to a maximum of about 0.4 RSV; then the material must be transferred to a heated and vented extruder or dough mixer type of apparatus capable of providing the powerful agitation necessary for the release of glycol evolved in the reaction from the highly viscous molten resin, and such further processing is limited to a maximum degree of polymerization equivalent to an RSV of approximately 1.3 which is rather unsatisfactory for blow or injection molding or other utilizations in which a very high molecular weight resin is desired. Besides requiring expensive equipment and a high consumption of power, difficulties are frequently encountered in this method in discoloration of the resin by excessive heat generated by the heavy shear forces in mixing the melt.

Many proposals for solid state polymerization of polyethylene terephthalate and similar polyesters have been made, and these have often mentioned the initial formation of a prepolymer or low order polymeric material by melt-polymerization followed by polycondensation of the prepolymer in the solid state by further heating at lower temperatures. While there are a number of known advantages for solid phase post-polymerization of polyesters as exemplified by the use of simpler equipment, lower manufacturing costs, improved product color, low content of combined diethylene glycol as well as higher melting points, and higher molecular weight polymers; nevertheless, the difficulties and problems experienced in solid state polycondensation as described hereinafter have precluded its commercial use on any substantial scale.

These earlier proposals for the solid phase polymerization have generally involved the processing of relatively small particles for instance, Pat. No. 2,534,028 mentions using fine powders smaller than 20 mesh to increase the reaction rate. Pat. Nos. 3,342,782, 3,330,809 and 3,075,-952 disclose suspending prepolymers in the fluidized condition in a stream of hot inert gas. In Pat. Nos. 2,901,-466, 3,344,091 and 3,117, 950, polymerization is accomplished by stirring and heating prepolymer particles in an inert atmosphere under very low pressure; and hot inert gases have been employed in polycondensing static beds of pulverized prepolymers at atmospheric pressure.

High polymerization rates are generally desirable in commercial practice and these require substantially elevated temperatures, but reaction temperatures have been severely restricted by the relatively low sticking temperature of polyester prepolymers. It is to be emphasized that the softening and sticking points are usually considerably below the crystalline or equilibrium melting temperatures of polyesters.

The expression "sticking temperature" is used herein to correspond with the definition on page 49 of the aforesaid Sorenson et al. text of the polymer-melting temperature as that temperature where a polymer sample becomes molten and leaves a trail when moved across a hot metal surface with moderate pressure; and this is commonly determined on a metal bar or elongated plate heated in such manner as to establish a temperature gradient along its length. A thermocouple may be used to determine the temperature at the point where the trail begins.

The softening temperature is conveniently determined by the Vicat needle test described in ASTM method D1525–65T.

The crystalline melting temperature (equilibrium melting temperature) is also defined in the Sorenson et al. book on page 45 as "that temperature where the last trace of crystallinity disappears under equilibrium conditions." This melting point may be determined with substantial accuracy by differential scanning thermal analysis at a heating rate of 20° C./min., as described by W. W. Wendland, in "Chemical Analysis," Interscience Publishers, New York, N.Y., vol. 19, Chapter 5 (1964), much more rapidly and also more conveniently than by actual equilibrium melting point determinations.

The solid phase polycondensation of polyesters has been held back mainly by the tendency of the polymer particles to agglomerate when the sticking temperature is reached and to form a large massive cake at temperatures well below the melting point of the resin. In the case of fluidized bed systems, fluidization is terminated by agglomeration. When static beds of resin particles fuse, the passage of an inert carrier gas and the removal of ethylene glycol from the conglomerate are greatly hampered with a corresponding reduction in process efficiency. In prepolymer beds of substantial depth, severe compaction takes place with both powders and granules. Finally, the difficulty in removing the caked resin from the reactor is greatly increased by its adhesion to equipment walls.

Polyethylene terephthalate exhibits various solid-liquid transition temperatures at which the material begins to flow under stress at a rate which is determined by the viscosity of the polymer. Amorphous resins of relatively low molecular weight (e.g., about 0.4 RSV) soften and collapse under a load at about 70° C. and particles of the material cohere to form an agglomerate and adhere to stainless steel at about 110–150° C. according to the load applied. Understandably, low molecular weight polymeric material deforms and sinters more readily than a higher molecular weight resin. The sticking temperature mentioned earlier provides a good overall measure of the adhesion and softening characteristics that promote agglomeration.

The resistance of polyester prepolymers and resins towards sticking at elevated temperatures is also affected by the composition of the polymer or copolymer; however, the crystalline melting point is similarly affected as a high melting resin has a higher sticking temperature than a resin having a low melting point. Accordingly, determination of the crystalline or equilibrium melting point affords a convenient method of assessing the effects of resin composition. For illustration, polyethylene terephthalate prepolymer usually contains a small amount of combined diethylene glycol and this has a profound effect upon the melting point of the resin. For instance, the melting point of polyethylene terephthalate containing only 0.6% combined diethylene glycol by weight is 270° C. whereas a similar resin with a content of 3.6% has a melting point of 250° C. On the other hand, the melting point of poly-(1,4-cyclohexanedimethylene terephthalate) is about 290° C.

The undesirable effects of such agglomeration in the solid phase polycondensation technique have long been recognized. Various proposals for solving the problem have been made with only limited degrees of success, because it is necessary to employ relatively low polymerization temperatures thereby restricting the rate of polycondensation. For instance, Pat. No. 3,014,011 describes the treatment of polyethylene terephthalate pellets with steam or organic solvents and vapors to produce crystalline products which do not stick together at 160° C. In the process of Pat. No. 3,330,809, the particles of polyethylene terephthalate are kept in vigorous motion while being instantaneously heated through a critical "glass temperature" range from 69° C. to about 130–200° and the crystallized polymer is then polycondensed as a fluidized powder at 218° C. Heighton et al. Pat. No. 3,405,098 is concerned with forming an amorphous prepolymer by quenching a melt-polymerization product followed by heating at 150–200° C. to form a partially crystallized polyester that is ground to 20–200 mesh and then further polymerized at 215–225° C. under vacuum. The maximum viscosity of the prepolymer used in that process appears to be limited considerably by grinding and other considerations; and the polycondensation temperatures are also quite restricted for it is stated that agglomeration occurs above 235° C. no matter how crystalline the prepolymer may be and there is also a caution as to fluidization difficulties above 225° C.; also there is no disclosure or apparent understanding that polycondensation at such relatively low temperature raises the sticking temperature of the resin and permits further polycondensation at temperatures well above 235°. Small charges of resin have also been suggested to minimize agglomeration, but this entails an undesirable reduction in production capacity. While higher temperatures ranging up to 250° C. have been mentioned in the prior art for the solid state polycondensation of polyethylene terephthalate, such disclosures apparently relate only to laboratory scale experimentation without specifying how the agglomeration problem was solved; hence there is no reason to presume that large scale operations at such temperatures were feasible heretofore.

In view of the limitations and difficulties encountered with prior methods of polycondensing polyesters, there is a need for improved methods for performing such polycondensations in the solid state in general, particularly in a simpler and more economical process, as well as for providing greater flexibility as to reaction rates by the use of higher reaction temperatures and/or obtaining higher molecular weight products that were feasible in prior commercial production.

SUMMARY OF THE INVENTION

The present invention is an improved process for increasing the molecular weight of polyester resins in which the improvement lies in heating a thermoplastic crystalline resin having a reduced specific viscosity of at least 0.2 and containing linear polymers of at least one ester of at least one dihydric alcohol and at least one carbocyclic dicarboxylic acid under solid phase polycondensation conditions including maintaining an initial polycondensation temperature between the sticking temperatures of said resin in the amorphous state and in the initial crystalline state for a period sufficient to raise the sticking temperature of said partially polycondensed resin substantially above said initial crystalline sticking temperature and thereafter increasing the polycondensation temperature to an elevated temperature substantially above said initial crystalline sticking temperature for further polycondensation without substantial fusion of said resin in producing a resin of substantially higher molecular weight.

Narrower aspects of the invention relate to combinations of the aforesaid process which include one or more of such features as employing a maximum polycondensation temperature between about 2 and 10° C. below the final crystalline melting point of the resin, keeping the polycondensation temperature between about 2 and 12° below the advancing sticking temperature of the resin for a substantial part of the reaction period, crystallizing the resin prior to polycondensation by heating it at an elevated temperature somewhat below the sticking temperature of the amorphous resin, utilizing resins derived chiefly from terephthalic acid and a lower alkylene glycol, more specifically polyethylene terephthalate, as well as polycondensing the resin initially at about 200 to 230° and subsequently above about 240° C.

DESCRIPTION OF SPECIFIC EMBODIMENT

The instant process provides important benefits in elevating the sticking temperature of a crystalline polyester resin or prepolymer beyond its initial sticking temperature in the crystalline state, and raising its softening point (minimum temperature for deformation under a specified load) to closely approach its melting point; then efficiently and economically polymerizing or polycondensing the material over a wider range of polymerization temperatures and other conditions then were feasible heretofore. In addition the degree of polymerization may optionally be carried further to provide resins with molecular weights higher than those previously obtainable in commercial operations, for example, molecular weights of several hundred thousand and more as evidenced by a reduced specific viscosity above 4 or 5; and increases of the crystalline melting point are realized with certain resins. These advantages can be obtained by various embodiments of a simple polycondensation operation which may be carried out in known equipment at low cost. Moreover, the process may be carried out in either batch or continuous operations.

While the present description is concerned to a large extent with the polycondensation of polyethylene terephthalate prepolymer by reason of the commercial importance of this material and also to provide valid comparisons, the method is also suitable for the treatment of similar homopolymers and copolymers. These may be exemplified by the crystallizable homo- and copolymeric esters of terephthalic, chloroterephthalic, nitroterephthalic or hydrogenated terephthalic acids with one or more glycols, such as ethylene glycol, propylene glycol, 2,2-dimethyl-propanediol-1,3,1,4-butene glycol and 1,4-cyclohexanedimethanol, as well as copolymers of the type which may be derived from one or more of those glycols and a plurality of acids comprising (1) substituted and unsubstituted terephthalic acids as just described and also (2) one or more of such acids as adipic, sebacic or 2,6-naphthalene dicarboxylic acids. For instance, suitable copolyesters may be prepared from terephthalic acid and a mixture of ethylene glycol and 2,2-dimethyl-propanediol-1,3, or from ethylene glycol and a mixture of a major proportion of terephthalic acid and a minor proportion of isophthalic acid. It will be appreciated that the polyesters involved here are not limited to those prepared from such glycols and acids per se, for other preparatory methods are usually suitable as exemplified by the esterification of terephthalic acid with alkylene oxides, such as ethylene oxide, or the transesterification of dimethyl terephthalate with ethylene glycol.

Any crystalline prepolymer of such linear polyesters which has an RSV of at least about 0.2 (number average molecular weight of at least about 4000 in the case of polyethylene terephthalate) or more may be advantageously treated in the present process and the starting resins generally have an RSV of about 0.4 to 1.3 or more (polyethylene terephthalate molecular weight above about 9000). As indicated earlier, these materials are typically prepared by known melt-polymerization techniques, and the molten resin is converted from the amorphous to the crystalline state prior to polycondensation in order to elevate its sticking temperature sufficiently to prevent agglomeration during the initial exposure to relatively low polycondensation temperatures as described herein. This crystallization can be accomplished by any suitable treatment such as slowly cooling an extruded or cast polymer melt to room temperature, or a quenched polymer melt in the amorphous state may be crystallized by controlled heat treatment or treating the solid resin with organic solvents with vapors or with steam as mentioned hereinbefore.

In the case of polyethylene terephthalate prepolymers, their sticking temperatures on stainless steel plates are typically of the order of about 230° C. after crystallization in contrast with the usual range of about 110 to 150° for the amorphous state. Such crystallization may desirably be performed by heating the resin at temperatures in the range of about 100 to 170° C. At the outset, the resin temperature is desirably kept somewhat below its original or amorphous sticking temperature to avoid adhesion, but a somewhat higher temperature may be employed after crystallization has progressed somewhat. While heating at 160° C. for as little as 5 or 10 minutes may induce crystallization in some of these resins, longer residence times are generally desirable when temperatures at the lower end of the range are used. Suitable time-temperature relationships are readily determined by observing the change in appearance of the particular resin or prepolymer selected from translucent to opaque as an indication of substantial crystal formation in the resin.

Although it is contemplated that a resin in the form of thin films, filaments or ribbons may be polycondensed in the treatment of the present invention, it is usually preferred to subdivide the material as by flaking or chopping a film or sheet into thin pieces or by chopping or cutting filaments, ribbons or rods. In addition, the chopped material may be ground or pulverized in a mill to provide a fine powder suitable for further polymerization in a fluidized operation. In general, the resin may be subdivided either before or after it is crystallized, and it is often chopped or cut in the amorphous state, but pulverizing operations are usually facilitated by feeding a resin that has been hardened by crystallization.

In many instances, it may be desirable to polycondense the resin in the form of a static bed of granules, pellets or flakes of the resin or to employ a fluidized bed of fine particles, and continually maintaining a flow of an inert carrier gas (e.g., nitrogen) through the bed is often desirable to promote agitation as well as to carry off glycol liberated during the polymerization reaction. Regardless of the polymerization system utilized, a vacuum system or other provision should be made for removing the glycol liberated in the reaction.

Suitable polycondensation temperatures may range from a temperature just elevated sufficiently above the threshold temperature of the polymerization reaction (typically 180° C. for polyethylene terephthalate) to provide an acceptable reaction rate up to temperatures within a few degrees of the advancing sticking temperature of the resin or of its melting point in the present process. The reaction temperatures differ somewhat for polymers or copolymers of different composition and of different molecular weight or RSV. In the case of polyethylene terephthalate, the overall polycondensation temperature range may extend from about 200 to 270° C. In the initial reaction stage, the temperature of any suitable resin is maintained well above the sticking temperature of the amorphous resin and above the threshold of the polycondensation reaction to procure an acceptable reaction rate but below the initial crystalline sticking temperature of the resin (i.e., after crystallization of the resin and without further treatment) in order to avoid sticking or agglomeration of the material; thus an initial polycondensation temperature in the range of about 200–230° C. is generally desirable for polyethylene terephthalate. Since this initial stage often requires only a small fraction of the total polycondensation time, the initial reaction rate is relatively unimportant and due consideration may be given to employing a relatively low reaction temperature within the stated range to alleviate any influence which tends to promote agglomeration of the resin particles as in the case of a deep or heavily loaded resin bed.

It has been found that this initial polycondensation produces surprising effects in substantially increasing the sticking temperature of the resin above its initial crystalline sticking temperature and also increasing its softening point in a relatively short time which is often a half hour or less. In the present method, advantage is taken of this to substantially elevate the reaction temperature either stepwise or in a continuous gradient to a temperature level well above the initial crystalline resin sticking temperature while still remaining somewhat below the present or elevated sticking temperature and also the melting point of the resin in any event. With polyethylene terephthalate resins, the actual temperature of the resin is usually raised to the range of about 240 to 270° C. during the reaction, and preferably above 250° in many instances. Such an increase or increases in the polycondensation reaction temperature to higher temperature levels than were deemed feasible in prior art polycondensation reaction of the solid state type and without encountering any troublesome agglomeration of the resin particles has provided the benefits of faster reaction rates and higher molecular weight polyester resin products as stated earlier. In one embodiment of the invention, the polycondensation temperature is raised during the reaction to a maximum of only a few degrees (e.g., about 2 to 10° C.) below the final crystalline melting point of the resin. In another modification, the reaction temperature is maintained between about 2 and 12° C. below the advancing sticking temperature of said resin for at least a substantial part of the total polycondensation period.

The polycondensation reaction may be carried out at pressures in the range of about 0.001 to 1000 mm. of mercury, and subatmospheric pressures are usually preferred for efficient removal of the glycol evolved. For the same purpose, it is often advantageous to have at least a small flow of an inert gas, such as nitrogen, carbon dioxide, helium or hydrocarbons boiling below 300° C. passing through a polycondensation reactor or apparatus to assist in carrying off the glycol formed.

The total time required for polycondensation is dependent upon a number of variables including the reaction temperatures, the composition and molecular weight of the prepolymer or resin, the catalyst, and the desired molecular weight of the product. In general, the reaction time may range from as little as a half hour for the moderate polycondensation of a prepolymer of considerable molecular weight at temperatures near the upper end of the stated ranges to as much as 48 hours for polymerizing a low order prepolymer to an extremely high molecular weight or temperatures in the lower part of said ranges, but more oftentimes of 1 to 20 hours are employed.

A catalyst is generally necessary to obtain polymeric products of high molecular weight, but the catalyst is usually added during the preparation of the prepolymer since the catalysts known to be effective for melt-polymerization also generally provide good results in the solid state polycondensation of polyesters as suggested by L. C. Hsu in NASA Technical Note D–4335 (1968). Many suitable catalysts are set forth in the comprehensive articles of R. E. Wilfond in J. Polymer Sci., 54, 385–510 (1961) and W Griehl and G. Schnock in J. Polymer Sci., 30, 413–422 (1958) as well as the prior patents cited hereinbefore. Among the many good catalysts are antimony trioxide, zinc acetate, tin oxalate, cobaltous acetate, lithium glycoloxide, germanium dioxide, stannous formate and tetrabutyl titanate, to name only a few.

For a better understanding of the nature and objects of this invention as well as its benefits and advantages, reference should be had to the following examples which are set forth for purpose of illustrating the invention rather than limitation of its scope. Unless otherwise specified, all proportions are set forth in terms of weight and all temperatures as degrees centigrade.

EXAMPLE 1

A polyethylene terephthalate prepolymer obtained by the esterification of terephthalic acid with ethylene glycol in the presence of 0.05% of calcium acetate monohydrate and 0.05% of antimony trioxide followed by melt polymerization at 270° C. under an absolute pressure of 0.1 mm. mercury, is extruded and quenched as a monofilament of 1.5 mm. diameter. The RSV of this amorphous material is 0.4 and its sticking temperature is 140° C. The monofilament is cut into 2.5 mm. lengths and heated overnight in an oven at 110° C. to convert the resin to the crystalline state. The crystallized material has an RSV of 0.4, a sticking temperature of 230° and the crystalline melting point is 258° C.

A batch of these crystallized particles is then placed in a closed cylindrical glass reaction vessel having a round bottom and equipped with a slowly rotating steel paddle agitator. After evacuating the vessel to an absolute pressure of 0.01 mm. mercury, this reactor is placed in an oil bath maintained at about 255° C. After 20 minutes of this heating, cohesion of the resin particles into large masses occurs to such as extent that effective stirring is no longer possible, and this experiment is discontinued.

Another batch of the cut monofilaments is subjected to progressive heating in a reaction vessel of the same type at the same subatmospheric pressure by immersing the reactor in an oil bath preheated to about 200° C. and the bath temperature control is maintained at this setting for one hour; then the bath temperature is increased to approximately 255° in the course of a second hour and held at that temperature level until the glass vessel is removed from the bath after a total residence time of 8.5 hours. During the course of the reaction, numerous determinations of the temperature of the resin pellets are made by means of a thermocouple inside the reaction vessel, and resin samples are removed at various intervals for testing the resin viscosity and sticking characteristics. This information is summarized in the table hereinafter along with characteristics of the resin in the amorphous and crystalline state before polycondensation.

TABLE 1

| Pellet temperature (° C.) | Cumulative polycondensation time (hours) | RSV | Crystalline M.P. (° C.) | Sticking temperature (° C.) |
| --- | --- | --- | --- | --- |
| Melt quenched (amorph.) | | 0.4 | | 140 |
| 110 (crystallized) | | 0.4 | 258 | 230 |
| 110–190 | 1 | 0.42 | | 238 |
| 190–240 | 2 | 0.49 | | 245 |
| 245–249 | 4 | 0.64 | | 250 |
| 245–250 | 7 | 0.86 | 260 | 255 |
| 245–250 | 8.5 | 0.92 | 260 | 257 |

These data demonstrate the heretofore unknown effect in that the sticking temperature of such crystalline resins can be progressively raised to a temperature level very close to the crystalline melting point of the resin by progressively advancing the reaction temperature while still remaining somewhat below the resin sticking temperature at every stage of the condensation reaction. Thus, in this reaction, the reaction or pellet temperature is raised rapidly to a level well above the amorphous resin sticking temperature (140° C.) during the first hour, but almost two hours elapse before the reaction temperature reaches the 230° initial crystalline sticking temperature of the resin and the sticking temperature rises to almost 245° by that time; then the reaction temperature is further elevated to a maximum of 250° C. at a time when the resin sticking temperature is now at a level above 250° C. and approaching the final crystalline melting point of 260° C. Stirring is continued through the course of the reaction without encountering any difficulties from resin agglomeration or adhesion to equipment surfaces. There is no evidence of any thermal degradation inasmuch as the product is of good color. The increase in viscosity from 0.4 to 0.92 RSV is indicative of a substantial increase in the molecular weight of the resin.

EXAMPLE 2

To demonstrate the pronounced effect of progressive heating upon the softening point of polyester resins, 1⁄8″ x 1⁄2″ x 4″ bars of amorphous polyethylene terephthalate with a crystalline melting point of 250° C. and an RSV of 0.74 are obtained by the injection molding of the resin in a cold mold.

These bars are subjected to a 5-stage heat treatment in a battery of laboratory ovens wherein bars at ambient temperature are first placed for one hour in a preheated oven which is maintained at 110°; then the bars are transferred to an oven preheated to 190° for a half hour residence time therein, and this is followed by successive transfers to ovens maintained at 230, 250 and 260° C., respectively, for a half hour of heating at each of these higher oven temperatures. A sample is removed at the time of each transfer for cooling and determination of the Vicat softening temperature produced by that stage of heat treating and the results are tabulated hereinafter.

TABLE 2

| Stage | Heat treatment and oven temperature | Vicat softening point (° C.) |
|---|---|---|
| | Start | 71 |
| 1st | 110° C./60 min | 123 |
| 2d | 1st plus 190° C./30 min | 195 |
| 3d | 2nd plus 230° C./30 min | 234 |
| 4th | 3rd plus 250° C./30 min | 251 |
| 5th | 4th plus 260° C./30 min | 248 |

From these results, it is evident that a polyester resin is hardened very substantially by progressive heating at increasing temperatures according to the present invention. This is important in overcoming resin sticking problems, because the softening and deformation of resin particles increases the areas of the surfaces of resin particles in contact with one another, and thereby tends to promote undesirable agglomeration of resin particles and their adhesion to equipment, particularly in the case of particles located near the bottom of a heavily loaded reactor in large scale commercial operations. In this connection, it may be noted that a heavy load equilavent to about 1400 p.s.i. is utilized in the Vicat test method and there is seldom, if ever, any need to subject polyester resins to such loading at polycondensation temperatures.

In repeating the above sequential heat treatment with a polyethylene terephthalate resin of higher molecular weight (1.24 RSV), it is observed that the Vicat softening point is about 5 to 8" higher than the temperatures in Table 2 after each stage of the treatment.

EXAMPLE 3

A polyethylene terephthalate resin is produced by the reaction of dimethyl terephthalate and ethylene glycol in the presence of 0.06% antimony trioxide and 0.68% manganous acetate tetrahydrate as ester interchange catalysts as well as 0.15% titanium dioxide (all of these percentages being based on the dimethyl terephthalate) as a delusterant followed by melt-polymerization. The resulting polymer is cast from the melt at 270° C. onto a cold, rotating, stainless steel cylinder in the form of a 3/32 inch continuous sheet of 12-inch width. This amorphous resin is of intermediate molecular weight as evidenced by an RSV of 0.98, and it displays a relatively high sticking temperature of 205° C. in tests on a stainless steel plate heated to a suitable gradient of temperatures; also, noticeable softening of the material occurs at 150° and it becomes very soft at 190°.

After chopping the material in a commercial granulating machine into chips which pass through a 4-mesh screen, the chips are crystallized by heating in circulating air ovens. First, the chips are placed in an oven preheated to 110° C.; then after 30 minutes, they are transferred for a period of one hour to an oven operating at 160° C. This heat treatment does not alter the RSV, but the polyester becomes considerably harder, for the first signs of softening are apparent at 220° and the sticking temperature is now 230°; the melting point of the crystallized resin is 250° C.

A 4-foot vertical stainless steel tube of 4" diameter and equipped with a gas inlet at the bottom is filled with crystallized resin chips that have been preheated to 190–200° C. A piece of aluminum foil is employed to loosely cover the open upper end of the tube and a long thermometer is pushed through the foil and 6" down into the resin bed. With dry nitrogen passing through the tube at a rate of 10 liters per minute, the assembly is placed in a circulating air oven preheated to 100° C. and the oven control is reset for an oven temperature of 265° which is attained in the course of one hour. By reading the thermometer at intervals, the actual resin temperature is found to be 185° C. after 60 minutes in the oven, 230° after 100 minutes, 250° after 140 minutes, 260° after 190 minutes and 265° C. after 220 minutes have elapsed. After a total of 18 hours of heating in the oven, the resin is allowed to cool to ambient temperature before the flow of nitrogen is shut off. No difficulty is encountered in removing the product from the tube despite some slight cohesion of the charge, and the resin chips are readily separated without the use of tools or crushing equipment. This condensation product is found to have an RSV of 2.48, indicative of a large increase in molecular weight during the reaction; its melting point of 269° C. is substantially higher, and it displays no tendency to stick to stainless steel below this temperature.

EXAMPLE 4

Another batch of the crystallized polyethylene terephthalate chips of Example 3 are ground to a particle size smaller than 40-mesh in a mill. A quantity of the resulting particles are placed in a glass test tube which is evacuated to an absolute pressure of 0.01 mm. mercury. This tube is then placed in a stirred and preheated oil bath which is maintained at a temperature of 200° C. After 15 minutes in the bath, the bath temperature is gradually increased to 246° over a period of 25 minutes and held at that level for 55 minutes before it is raised to a final temperature of 265° C. over a 20-minute interval. After 2.8 hours at the latter temperature, the reaction tube is removed and cooled while still maintaining the vacuum therein. No difficulties are encountered with sticking in the course of the reaction, and a very large increase in molecular weight is evidenced by the increase in resin in viscosity from 0.98 to 5.2 RSV. Upon heating, it is observed that the product becomes rubbery at 270° but still does not stick to stainless steel, and its crystalline melting point is found to be 272° by differential scanning calorimetry.

EXAMPLE 5

A low molecular weight polyethylene terephthalate with an RSV of 0.44 and a content of 0.025% antimony trioxide (based on the terephthalic acid charged) is prepared by esterification and melt polymerization at 284° C. until the carboxyl content is 22 equivalents per million grams.

This material is extruded as a monofilament of 3/16 inch diameter, quenched and cut into pellets of 1/8 inch length. Substantial softening of this prepolymer is observed at 85° C. and the sticking temperature of the amorphous material is found to be 140° C. After the resin is converted from the amorphous to the crystalline state by heating for a half hour in an oven at 110° C. and one hour at 160° C. as described earlier, the crystalline product is found to have a sticking temperature of 234° and a melting point of 258° C.

In a manner like that of Example 3, a 4-foot long vertical tube provided with upper and lower gas connections is filled with six pounds of the crystallized, preheated resin and nitrogen is passed through the tube at a rate of about 15 liters of nitrorgen per minute. The tube is then placed in an oven preheated to 250° C. and held at that temperature for one hour; then the oven heat control is advanced to 270° for 6.5 hours. On the basis of the resin and oven temperatures observed in Example 3, it is estimated that the temperature of the resin bed gradually rises to 270° over a period of three hours and remains at that level for the balance of the run. After the polycondensed material is cooled as before, it is found that the slight cohesion of the material is readily broken by the application of pressure. This product is found to have an RSV of 1.25, a sticking temperature of 274° and a crystalline melting point of 278° C.

While the present invention has been described in specific detail in a limited number of embodiments for purposes of full disclosure and valid comparisons, it will be apparent to those skilled in the art that there are many other embodiments and modifications encompassed within the purview of this invention. Accordingly, the present invention should not be considered as limited in any particulars except as may be set forth in the appended claims or required by the prior art.

I claim:

1. In a process for the commercial scale production of polyester resins of high molecular weight involving the formation of an amorphous prepolymer by melt-polymerization, conversion of the amorphous prepolymer to the crystalline state and solid phase polycondensation of the crystalline prepolymer, the improvement which comprises heating a thermoplastic, crystalline resin having a reduced specific viscosity of at least 0.2 and consisting essentially of linear polymers of dihydric alcohol esters of terephthalic, chloroterephthalic, nitroterephthalic, isophthalic and hydrogenated terephthalic acids under solid phase polycondensation conditions including maintaining an initial polycondensation temperature between the sticking temperature of said resin in the amorphous state and in the initial crystalline state for a period sufficient to raise the sticking temperature of said partially polycondensed resin substantially above said initial crystalline sticking temperature and thereafter increasing the polycondensation temperature to an elevated temperature substantially above said initial crystalline sticking temperature for further polycondensation without substantial fusion of said resin in producing a resin of substantially higher molecular weight, said polycondensation temperature being maintained between about 2 and about 12° C. below the advancing sticking temperature of said resin during at least a substantial portion of the period in which said polycondensation is occurring.

2. A process according to claim 1 in which the maximum polycondensation temperature is between about 2 and 10° C. below the final crystalline melting point of said resin.

3. A process according to claim 1 in which said resin is crystallized prior to said polycondensation by heating said resin at a temperature below the sticking temperature of the amorphous resin.

4. A process according to claim 1 in which terephthalic acid constitutes at least a major proportion of said acid.

5. A process according to claim 4 in which a lower alkylene glycol constitutes at least a major proportion of said alcohol.

6. A process according to claim 1 in which said resin is polyethylene terephthalate.

7. A process according to claim 6 in which said resin is crystallized prior to said polycondensation by heating said resin at a temperature below the sticking temperature of said resin in the amorphous state and between about 110 and 150° C. for a period sufficient to produce substantial crystallization.

8. A process according to claim 6 in which said elevated polycondensation temperature is above about 235° C.

9. A process according to claim 6 in which said initial polycondensation temperature is between about 200 and 230° C. and said elevated polycondensation temperature is above about 240° C.

10. A process in accordance with claim 1 wherein said thermoplastic, crystalline resin is in the form of a member selected from the group consisting of films, filaments, rods, bars, ribbons, powder, pellets, chips and flakes.

References Cited

UNITED STATES PATENTS

| | | | |
|---|---|---|---|
| 2,901,466 | 8/1959 | Kibler et al. | 260—75 |
| 3,075,952 | 1/1963 | Coover et al. | 260—75 |
| 3,117,950 | 1/1964 | Kibler et al. | 260—75 |
| 3,405,098 | 10/1968 | Heighton et al. | 260—75 |
| 2,921,052 | 1/1960 | Caldwell et al. | 260—75 |

OTHER REFERENCES

Hsu, J. Macromol. Sci.-Phys. BI(4), 801–13 (1967).

MELVIN GOLDSTEIN, Primary Examiner

U.S. Cl. X.R.

260—75 T